United States Patent [19]

Numata

[11] Patent Number: 4,591,773

[45] Date of Patent: May 27, 1986

[54] MOTOR DRIVING CIRCUIT FOR MOTOR ACTUATOR

[75] Inventor: Hidetaka Numata, Furukawa, Japan

[73] Assignee: Alps Electric Co., Ltd., Japan

[21] Appl. No.: 687,641

[22] Filed: Dec. 31, 1984

[30] Foreign Application Priority Data

Dec. 29, 1983 [JP] Japan .............................. 58-200235[U]

[51] Int. Cl.⁴ ................................................ G05B 1/06
[52] U.S. Cl. ..................................... 318/663; 318/434; 318/436
[58] Field of Search ................. 318/434, 436, 663, 561

[56] References Cited

U.S. PATENT DOCUMENTS

| | | | |
|---|---|---|---|
| 3,927,359 | 12/1975 | Chen | 318/434 |
| 4,366,422 | 12/1982 | Rhodes | 318/561 |
| 4,379,986 | 4/1983 | Baxter et al. | 318/434 |
| 4,412,162 | 10/1983 | Kitamura | 318/434 |
| 4,504,881 | 3/1985 | Wada et al. | 318/434 |

Primary Examiner—B. Dobeck
Attorney, Agent, or Firm—Guy W. Shoup

[57] ABSTRACT

A motor driving circuit apparatus for use in a motor actuator for actuating, for example, a valve between two limit positions, having a control means for inputting a driving control signal for the motor, a sensor adapted to output a signal corresponding to the position of the actuator, and a comparator section adapted to compare the input through the control means and the output from the sensor, the comparator being adapted to produce an output signal in accordance with which the motor is driven and controlled. The motor driving circuit apparatus comprises a differentiation circuit for differentiating the output of the comparator section and a timer section adapted to be controlled by the output from the differentiation circuit, wherein the driving control of the motor by the output of the comparator section is conducted only within a predetermined period of time in accordance with the output from the timer section.

3 Claims, 2 Drawing Figures

MOTOR DRIVING CIRCUIT FOR MOTOR ACTUATOR

BACKGROUND OF THE INVENTION (Field of the Invention)

The present invention relates to a motor driving circuit apparatus for a motor actuator. More particularly, the invention is concerned with a motor driving circuit apparatus for use in a motor actuator of the type having a control means for inputting a driving control signal for the motor, a sensor adapted to output a signal corresponding to the position of the actuator, and a comparator section adapted to compare the input through the control means and the output from the sensor, the comparator being adapted to produce an output signal in accordance with which the motor is driven and controlled, the motor driving circuit apparatus characterized in that the time duration in which the driving control is conducted is limited by a timer.

(Description of the Prior Art)

FIG. 1 shows a known motor actuator having a motor 1 adapted to rotate a valve 2 through an angle $\theta$ between two positions A and B. Generally, the motor driving system of a motor actuator of the kind described incorporates a control means (not shown) for inputting a command position information and a sensor (not shown) for outputting the position information concerning the position of the valve 2. The motor driving system has a servo mechanism which is operated in response to the input from the control means and the output from the sensor so as to drive the motor 1 forwardly or reversely in order to rotate the valve 2 to a desired position. The motor 1 is stopped when the output from the sensor has become equal to the input through the control means, i.e., when the valve 2 has reached the command angular position appointed by the input delivered through the control means. In the operation of this motor actuator, however, it is quite likely that the valve is locked during rotation due to some obstruction while the driving current is being continuously supplied to the motor 1. This state is usually referred to as "motor lock". When the motor is continuously supplied with the driving current in the state of motor lock, the motor 1 is burnt out or otherwise damaged.

SUMMARY OF THE INVENTION

Accordingly, an object of the invention is to provide a motor driving circuit improved so as to overcome the above-described problem of the prior art.

To this end, according to the invention, there is provided a motor driving circuit apparatus for use in a motor actuator of the type having a control means for inputting a driving control signal for the motor, a sensor adapted to output a signal corresponding to the position of the actuator, and a comparator section adapted to compare the input through the control means and the output from the sensor, the comparator being adapted to produce an output signal in accordance with which the motor is driven and controlled, the motor driving circuit apparatus comprising: a differentiation circuit for differentiating the output of the comparator section and a timer section adapted to be controlled by the output from the differentiation circuit, wherein the driving control of the motor by the output of the comparator section is conducted only within a predetermined period of time in accordance with the output from the timer section.

The above and other objects, features and advantages of the invention will become clear from the following description of the preferred embodiment taken in conjunction with the accompanying drawings.

DESCRIPTION OF THE PREFERRED EMBODIMENT

Figure 1:
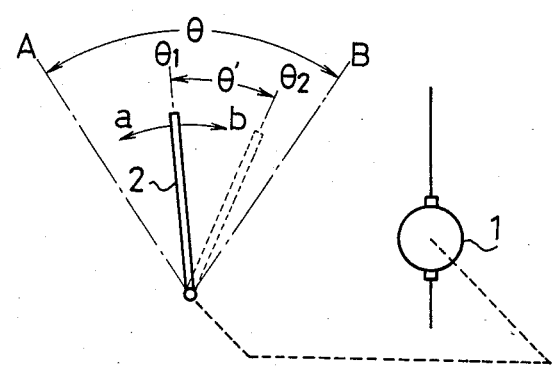
FIG. 1 is an illustration explanatory of the operation of a motor actuator.
Figure 2:
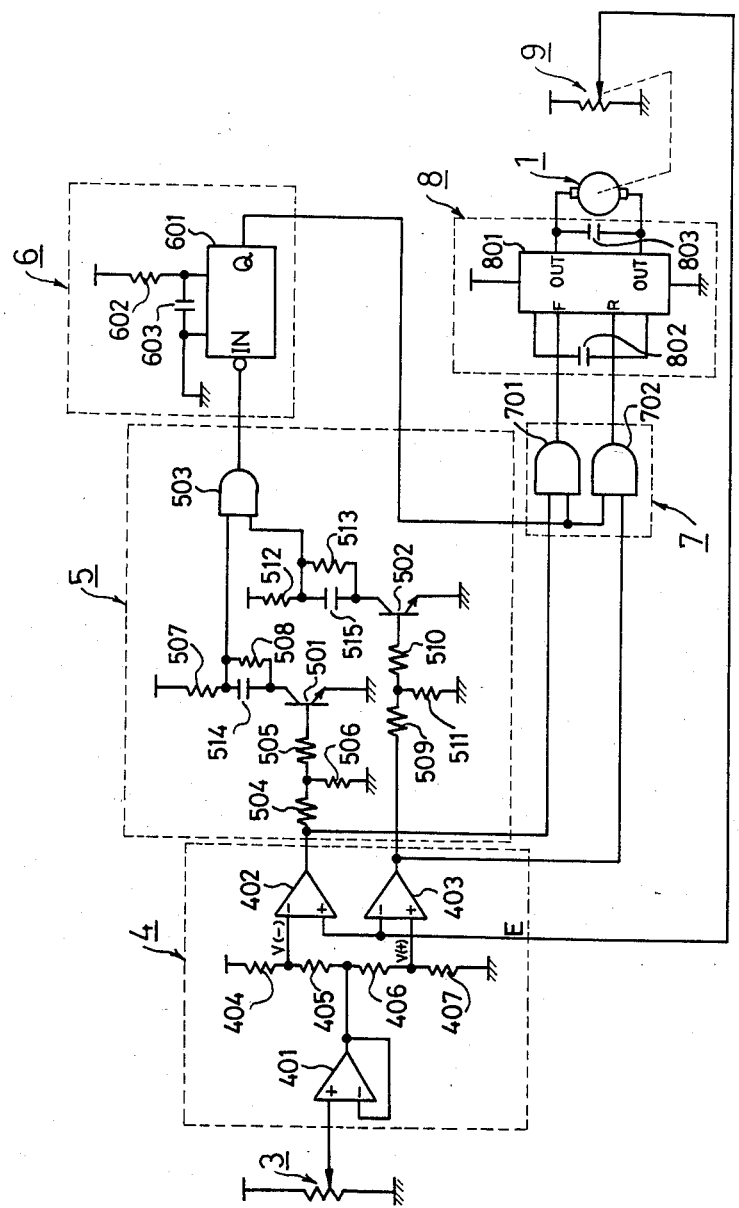
FIG. 2 is a circuit diagram of an embodiment of a motor driving circuit of the invention for use in a motor actuator.

FIG. 2 shows a circuit arrangement of an embodiment of the invention. In this Figure, a reference numeral 1 denotes a motor corresponding to that in FIG. 1. This embodiment of the invention is composed of various parts: namely, a control volume 3; a comparator section 4 including an amplifier 401, comparators 402, 403 and resistors 404 to 407; a differentiation circuit section 5 including transistors 501,502, AND gate 503, resistors 504 to 513 and capacitors 514,515; a timer section 6 including a mono-multi IC 601, which may be a commercially available unit such as HD 14538, a resistor 602 and a capacitor 603; a gate section 7 including AND gates 701, 702; a motor driving section 8 including a motor driving IC 801 which may be a commerically available unit such as BA 6209, capacitors 802,803; and a motor sensor volume 9.

Before turning to the description of the motor driving circuit in accordance with the invention, the principle of operation of the motor actuator of the invention will be explained with specific reference to FIG. 1.

Referring to FIG. 1, the valve 2 is actuated by the motor 1 to rotate within the maximum angular range $\theta$ between the positions A and B. The time length required for the valve 2 to rotate through this maximum angular range is represented by (t). This time length (t) will be referred to as the "maximum time", hereinunder. Thus, the time length between the moment at which the valve 2 is started and the moment at which any motor lock occurs cannot be longer than the maximum time (t), regardless of the initial position and the locking position. According to the invention, the supply of driving current to the motor 1 is stopped at all events within the maximum time (t). Thus, the state of motor lock cannot continue longer than the maximum time (t). In an ordinary motor actuator of the type described, the maximum time (t) is quite short, say 10 seconds or shorter. Therefore, the motor does not get burnt out nor damaged even if it is held in the state of motor lock for the period of the maximum time (t).

From this point of view, the motor driving circuit of the invention for use in a motor actuator is constructed such that the supply of the driving current does not continue beyond the above-mentioned maximum time (t).

The invention will be more fully understood from the following description of the preferred embodiment when the same is read in conjunction with FIG. 2.

Referring to FIG. 2, the control voltage for driving the motor 1 is inputted through the control volume 3, while the motor sensor volume 9 is operatively connected to the motor 1 so that it can produce and output a voltage corresponding to the position of the valve 2 shown in FIG. 1. The input voltage from the control volume 3 and the output voltage from the motor sensor volume 9 are compared with each other in the comparator section 4, and the driving current supplied to the motor 1 is controlled in accordance with the result of the comparison. The operation of the embodiment shown in FIG. 2 will be explained with reference to FIG. 1.

In order to simplify the explanation, the output voltage of the motor sensor volume 9 (referred to as "sensor voltage E", hereinunder) and the directions of rotation of the motor 1 are defined as follows:

(i) The sensor voltages obtained when the valve 2 (see FIG. 1) takes the positions A and B, respectively, are expressed by E(A) and E(B) which meet the condition of E(A)<E(B). Thus, the motor sensor volume 9 produces a sensor voltage E which varies within the range of $EA \leq E \leq EB$, corresponding to the position of the valve 2 within the maximum angular range $\theta$ of movement.

(ii) The direction of the operation of motor for rotating the valve 2 in the direction of an arrow (b) is defined as the "forward" direction, while the direction of operation for driving the valve 2 in the direction of an arrow (a) is defined as the "reversing" direction.

The operation of the embodiment shown in FIG. 2 will be explained hereinunder. It is assumed here that the motor actuator is in a safe condition without suffering any abnormality such as motor lock, and the valve 2 is stationed at the position $\theta_1$ shown in FIG. 1. In this state, the motor sensor volume 9 produces an output, i.e., the sensor output, $E(\theta_1)$ which falls within the range expressed by $\{E(A)<E(\theta_1)<E(B)\}$. This sensor voltage $E(\theta_1)$ is supplied to the (+) terminals of the comparators 402, 403 of the comparator section 4. Meanwhile, a voltage inputted through the control volume 3 is amplified by the amplifier 401 and is divided by the resistors 404 to 407, and a divided voltage is applied to the (−) terminal of the comparator 402. This voltage is referred to as "control voltage V(−)", hereinunder. The control voltage has a potential below that of the sensor voltage $E(\theta_1)$. Similarly, a voltage (referred to as "control voltage V(+)", hereinunder) is applied to the (+) terminal of the comparator 403. The control voltage V(+) has a potential higher than the sensor voltage $V(\theta_1)$. Consequently, the comparators 402 and 403 produce outputs of Low level (referred to as "L", hereinunder). Therefore, in each of the AND gates 701 and 702 in the gate section 7, one of the input terminals receives a signal "L", regardless of the state of output from the terminal Q of the mono-multi IC 601 in the timer section 6. Consequently, the F and R terminals of the motor driving IC 801 in the motor driving section 8 receive signals "L", so that the OUT terminal of the motor driving IC does not deliver the driving current to the motor 1. The motor driving IC 801 is adapted to deliver through its OUT terminal a driving current for forward rotation when its terminal F receives a signal H, and delivers through its OUT terminal a driving current for reversing rotation when its R terminal receives a signal H.

Thus, the valve 2 shown in FIG. 1 holds the position $\theta_1$ unless the control voltage inputted through the control volume 3 is changed.

For rotating the valve 2 to a desired angular position, the motor actuator operates in the following manner. For instance, in order to rotate the valve 2 from the position $\theta_1$ to a new position $\theta_2$ as shown in FIG. 1, the control volume 3 is operated to raise the levels of the control voltage (−) applied to the comparator 402 and the control voltage (+) applied to the comparator 403 by a level corresponding to the rotation angle $\theta$ (see FIG. 1) of the valve 2, so that the conditions of (1) control voltage V(−)>sensor voltage $E(\theta_1)$ and (2) control voltage V(+)>sensor voltage $E(\theta_1)$ are met. In consequence, the output from the comparator 402 is inverted to "H", while the output from the comparator 403 remains "L". As a result of the inversion of the output of the comparator 402 from "L" to "H", the output from the comparator 402 is differentiated by the differentiation circuit 5 and converted into a single pulse by the differentiation circuit 5, whereby the timer 6 is started. Namely, the mono-multi IC 601 in the timer section 6 continues to output, through its terminal Q, the output H for the period (t) corresponding to the time constant (t) which is determined by the resistance of the resistor 602 and the capacitance of the capacitor 603, from a moment at which the pulse signal "L" is received by the IN terminal thereof. (This time period (t) corresponds to the maximum time (t) mentioned before) Therefore, one of the inputs of the AND gate 701 receives the "H" signal from the comparator 402, and the other of the inputs receives the "H" signal outputted from the time section 6. Consequently, the AND gate 701 produces an output signal "H". As the "H" signal is supplied to the F terminal of the motor driving IC 801, the OUT terminal of the IC 801 delivers the driving current for the forward driving of the motor 1 as stated before. As a result, the motor 1 commences its forward operation so as to drive the valve 2 in the direction of the arrow (b) in FIG. 1. The rotation of the valve in the direction of the arrow (b) increases the output of the motor sensor volume 9, i.e., the sensor voltage E. When the valve 2 has been rotated to the position $\theta_2$, the sensor voltage E is increased to $E(\theta_2)$ which is equal to the control voltage V(−). Consequently, the output of the comparator 402 is changed to "L" thereby stopping the motor 1.

From the foregoing description, it will be understood how the driving circuit operates for rotating the valve 2 in the direction of the arrow (b) and stopping the same at the command position. In the event that the valve 2 is locked mechanically for some reason, the motor 1 inevitably undergoes the state of the motor lock as explained before. In the event of the motor lock, the motor driving circuit of the invention operates in the following manner. The sensor voltage E of the motor sensor volume 9 after the occurrence of the motor lock is lower than the voltage $E(\theta_2)$ mentioned before. Therefore, the comparator 402 continues to produce and output the "H" signal. Therefore, the supply of the driving current to the motor 1 is continued to hold the motor in the state of motor lock, insofar as the timer section 6 maintains the output signal "H". According to the invention, however, the timer section 6 is constructed to maintain the output "H" only for a time period (t), i.e., the maximum time. Thus, when the maximum time (t) has passed after the moment of commencement of rotation of the valve 2, the output of the timer section 6 is changed from "H" to "L", so that the supply of the driving current to the motor 1 is stopped to cease the state of motor lock. According to the invention, the state of motor lock can last only for a period of the maximum time (t) at the longest. Since the maximum time (t) is usually 10 seconds or shorter, the accident such as burning out of the motor can be avoided even if the motor lock has occurred.

The foregoing description of the controlling operation is based on an assumption that the motor lock has occurred during the rotation of the valve 2 in the direction of the arrow (b) in FIG. 1 towards the desired position, by a forward rotation of the motor 1. It will be clear, however, that the same controlling operation can apply to the case where the motor lock has occurred during the rotation of the valve in the direction of the arrow (a).

(Advantages of the Invention)

As will be understood from the foregoing description, according to the invention, it is possible to cease the state of motor lock in a motor actuator within a predetermied period of time, so that the accident such as burning out of the motor can be prevented advantageously.

What is claimed is:

1. A motor driving circuit apparatus for use in a motor actuator of the type having a control means for inputting a driving control signal for the motor, a sensor adapted to output a signal corresponding to the position of the actuator, and a comparator section adapted to compare the input through said control means and the output from said senor and to produce an output signal for driving said motor, said motor driving circuit apparatus comprising:

a differentiation circuit for differentiating the output of said comparator section, and a timer section adapted to be actuated by an output from said differentiation circuit so as to provide an output signal for a predetermined maximum period of time for driving of said motor, wherein the driving control of said motor by the output signal of said comparator section is conducted only within the predetermined maximum period of time in accordance with the ouput signal from said timer section.

2. The motor driving circuit apparatus of claim 1, wherein said control means and said comparator section are adapted for driving said motor in either a normal rotation or a reverse direction.

3. The motor driving circuit apparatus of claim 1, further comprising a gate section for gating the output signal from said comparator section and the output signal from said timer section and providing an output to said motor actuator during said predetermined maximum period of time.

* * * * *